March 7, 1972 R. C. ABT 3,647,671
ELECTROCHEMICAL MACHINING APPARATUS
Filed March 24, 1969
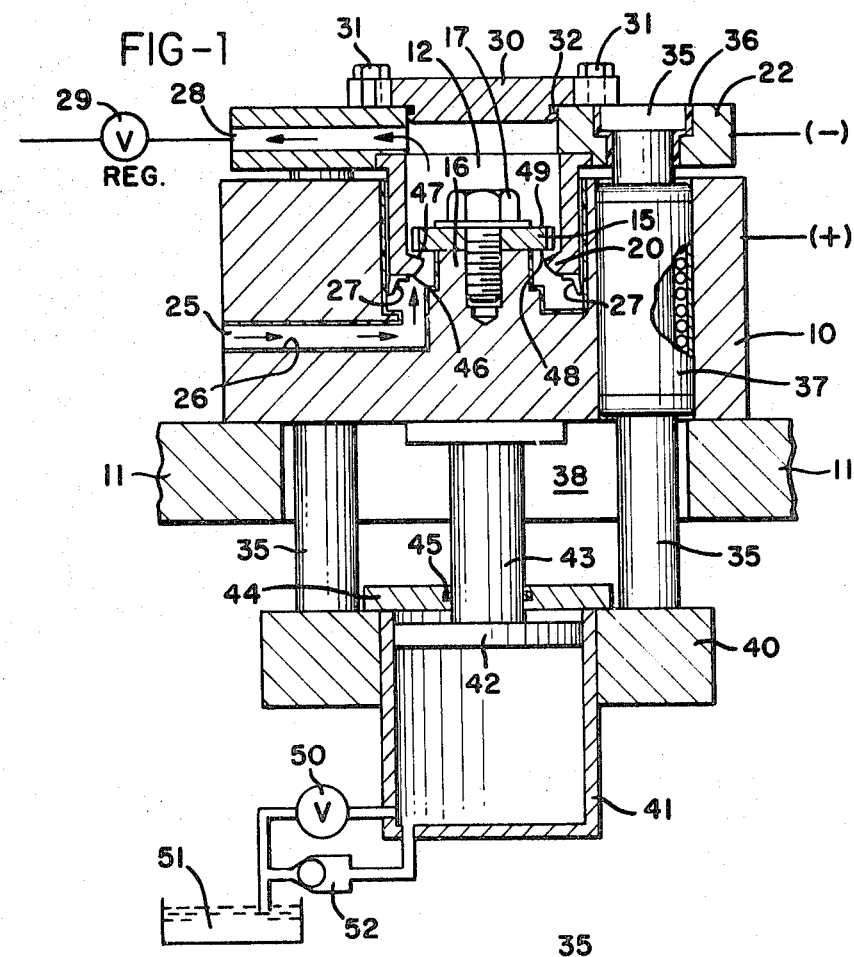
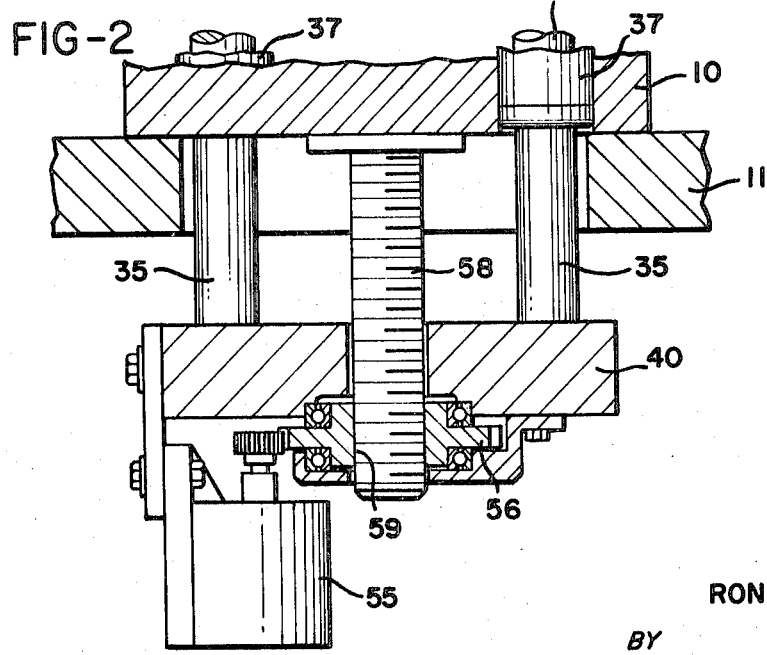
INVENTOR
RONALD C. ABT
BY
Marechal, Biebel, French & Bugg
ATTORNEYS United States Patent Office 3,647,671
Patented Mar. 7, 1972

3,647,671
ELECTROCHEMICAL MACHINING APPARATUS
Ronald C. Abt, Cincinnati, Ohio, assignor to
Cincinnati Milacron Inc., Cincinnati, Ohio
Filed Mar. 24, 1969, Ser. No. 809,706
Int. Cl. B23p 1/04, 1/12
U.S. Cl. 204—224
8 Claims

ABSTRACT OF THE DISCLOSURE

An electrochemical machining apparatus for machining to precise dimensions workpieces, such as gears, includes an electrolyte chamber in which is mounted the workpiece and an electrochemical machining tool. The tool is so positioned relative to the workpiece, and the chamber is so constructed, that electrolyte under pressure introduced into the chamber flows first over the tool and then between the tool and the workpiece. The hydrostatic forces generated within the chamber by the electrolyte under pressure cause the tool to be moved into the workpiece. Control means outside the electrolyte chamber govern the rate of movement of the tool relative to the workpiece so variable feed rates and accurate dimensioning and repeatability of machining is obtained. The control means may include a constant flow hydraulic valve or a constant speed hydraulic or electric motor which allows, but which does not cause, a constant rate of movement between the tool and workpiece.

BACKGROUND OF THE INVENTION

In normal electrochemical machining operations, flowing electrolyte is supplied between an electrochemical machining tool (cathode) and a workpiece (anode) to supply a path for electrical current and to act as a medium for removing the anodic products and the heat generated during machining. The electrolyte is supplied under sufficient pressure to insure an adequate and high velocity flow between these parts.

In conventional electrochemical machining operations, hydrostatic forces are generated due to the pressure of the electrolyte which often act against the direction of movement of the tool relative to the workpiece and cause deflection of the feed mechanism, the machine frame or the machining tool. For example, deflection of the feed mechanism and the machine frame must be kept to a minimum, e.g., 0.002 inch, during operation wherein the load may vary from zero at the start to as much as 10,000 pounds to as low as zero at breakthrough by the tool through the workpiece. Moreover, the conventional feed mechanisms include some backlash which must be controlled during load variation. At the start of a machining operation, as the load or separating force builds up, the backlash may cause a dwell at the start of a machining operation, and when the separating force drops suddenly, as at breakthrough, the backlash causes a "jump" in which the tool moves forward sometimes causing arcing because of the sudden change in the gap dimension and the change in flow conditions in the gap at breakthrough.

The use of large machine frames has reduced deflection and the effect of backlash, but it is difficult to maintain a constant load opposing the feeding of the tool. Since the tool is moved relative to the workpiece at a constant rate with these conventional devices, variations in the load cause variations in the feed rate. If the feed rate is not kept constant, the amount of overcut (the distance between the tool and the workpiece) may vary and the result will be uncontrolled variations in overcut and/or undesirable surface characteristics on the machined portion of the workpiece. In order to compensate for these undesirable characteristics, machines are employed which are large in physical size and weight and are consequently expensive to produce.

It is known to use the pressure of the electrolyte to feed the tool relative to the workpiece, see United States Pat. No. 3,058,895. In the system therein described, the rate of feed is directly related to the pressure of the electrolyte, i.e., the higher the pressure the faster the feed and vice-versa. Accordingly, any variation in pressure results in variation in feed rate.

Some techniques have been employed to reduce the forces acting against the movement of the tool relative to the workpiece. One such technique is described in British Pat. 1,045,634. In that patent, the area of the tool or the workpiece is adjusted so that the pressure of the electrolyte working against relative movement is smaller than in conventional machines.

SUMMARY OF THE INVENTION

This invention relates to an apparatus wherein the entire force needed to move the tool relative to the workpiece is supplied by the electrolyte, while the rate of movement between the tool and the workpiece is independently controlled by devices external to the electrolyte chamber. As a result of this invention, the electrolyte chamber and supporting mechanism equipment may be made smaller than previously possible and overcuts kept constant throughout the machining process.

In one embodiment, feed rate is governed by a hydraulic cylinder attached to but located externally of the electrolyte chamber, and a constant speed hydraulic flow control valve controls the rate at which hydraulic fluid flows from the cylinder. In another embodiment, feed rate between the tool and workpiece is controlled by a constant speed hydraulic or electric motor, also located externally of the electrolyte chamber. In both of these systems, the main motive force is supplied by the electrolyte, and only a restraining force is provided by the equipment external to the electrolyte chamber. Thus, the backlash which exists in such equipment is always in one direction regardless of any possible variations in load. Additionally, the motive force causing relative movement actually decreases when the tool breaks through the workpiece at the completion of machining.

It is therefore an object of this invention to provide an electrochemical machining apparatus of the type described wherein the motive force moving the tool relative to the workpiece is supplied entirely by electrolyte under pressure within the electrolyte chamber and wherein the rate of motion between the tool and the workpiece is controlled by devices external to the electrolyte chamber; to provide an improved electrochemical machining apparatus wherein the backlash within the mechanical parts is kept in one direction during variations in load; to provide an electrochemical machining apparatus wherein deflection forces acting within the electrolyte chamber are held to a minimum due to the hydrostatic forces existing within the chamber, these hydrostatic forces acting to cause relative motion rather than to restrain or resist it.

Other objects and advantages of the invention will be apparent from the following description, the accompanying drawings and the appended claims.

BRIEF DESCRIPTION OF THE DRAWINGS

FIG. 1 is a cross sectional elevational view of the improved electrochemical machining apparatus of this invention showing a hydraulic device located externally of the electrolyte chamber for controlling feed rate; and FIG. 2 is a cross sectional elevational view of a portion of the invention showing the feed rate controlling device employing a hydraulic or electric motor.

DESCRIPTION OF THE PREFERRED EMBODIMENT

One form of the electrochemical apparatus employing the concepts of this invention, shown in FIG. 1, includes a main body member 10 supported on a machine table 11. The body 10 has formed therein a chamber 12 in which a workpiece 15 is supported. As shown, the workpiece is mounted on an elevated portion 16 of the body within the chamber 12 and is secured thereto by a bolt 17. The body 10 is electrically conductive and is connected to the positive terminal of a power supply, not shown, and therefore carries current to the workpiece through the elevated portion 16 and bolt 17.

An electrochemical machining tool 20 is also located within the chamber 12 and is supported by a movable member 22. The electrochemical machining tool 20 may be formed similar to that tool shown and described in copending United States application Ser. No. 684,454, filed Nov. 20, 1967 now U.S. Pat. No. 3,499,830. The tool 20 is not only supported by the member 22 but is in electrically conductive relation thereto and is connected to the negative terminal of the same power supply.

Electrolyte is introduced into the chamber 12 through an electrolyte inlet port 25 at a pressure typically between 300–350 p.s.i. This pressure insures an adequate high velocity flow between the machining surfaces of the tool and the workpiece. This pressure is also adequate to provide the motive force required to move the tool relative to the workpiece within the range of feed rates desired. The electrolyte port 25 as well as the chamber 12 are coated with insulation 26 to prevent any electrochemical erosion thereof due to stray electrical currents flowing between the body 10 and the tool 20.

The tool 20 is provided with a seal 27 which slidably engages the internal surface of the chamber 12 to prevent electrolyte from flowing between the tool and the wall of the chamber, thus insuring that all of the electrolyte flows between the tool 20 and the workpiece 15. An electrolyte exit port 28 is provided in the member 22 to allow removal of the electrolyte from the chamber 12. Suitable back pressure, e.g., 50 pounds per square inch, may be applied to the electrolyte flowing from the port 28 by flow restricting means shown at 29.

Access to the chamber 12 and the workpiece 15 is obtained by removing a cover 30 from the member 22. The cover is secured in place by several bolts 31 which cooperate with lugs extending outwardly from the cover 30 so that when the bolts are loosened, a partial rotation will free the cover for removal. An O-ring 32 provides the seal necessary to prevent electrolyte from escaping between the cover 30 and the member 22.

The member 22 has attached thereto a plurality of downwardly extending guide posts 35, two of which are shown in FIG. 1. In the preferred embodiment, four such guide posts are employed. Each guide post is insulated from the member 22 by insulating means 36, one of which is shown at the upper right in FIG. 1, to prevent electrical shorting between the body 10 and the member 22. Antifriction means 37 support the guide posts 35 as it passes through the body 10 and also accurately maintains alignment of the member 22 as it moves relative to the body 10. In the preferred embodiment, a recirculating ball bearing type device is employed, such as those manufactured by Thomson Industries, Inc., of Manhasset, N.Y., under the trademark "Ball Bushings." This type of bearing provides for accuracy essential when machining gears, such as shown in the preferred embodiment.

The guide posts 35 extend through an opening 38 formed in the table 11 and have a plate 40 mounted at their lower ends. Attached to this plate is a hydraulic cylinder 41 which houses a piston 42 mounted to a shaft 43 which is secured to the body 10. The cylinder 41 has a covering plate 44 which includes an O-ring seal 45 surrounding the shaft 43.

When electrolyte is introduced into the inlet port 25, the pressure of the electrolyte acts against the lower surface 46 of the tool 20 to urge it upwardly. Since the area of the tool on the lower surface 46 is larger than the area on the upper surface 47, movement of the tool due to this differential force will result regardless of the magnitude of the back pressure within the chamber. Also, increasing the back pressure by flow restricting means 29 will urge the member 22 away from the workpiece 15 thus further producing a force which tends to move the tool into and through the workpiece.

Thus, relative movement between the tool and the workpiece is created solely by the hydrostatic pressure developed when the electrolyte is forced under pressure into the chamber 12. Since the tool is connected to the member 22 it too moves upwardly relative to the body 10 and carries with it the guide posts 35 and the plate 40 as well as the hydraulic cylinder 41.

The rate at which the tool moves upwardly or advances relative to the workpiece is controlled by the rate at which hydraulic fluid is allowed to exit from the cylinder 41. As shown in FIG. 1, a valve 50 is positioned between the cylinder 41 and a fluid reservoir 51. This valve controls and regulates within precise limits the volume of fluid leaving the cylinder 41 and thus regulates the rate at which the tool 20 advances into the workpiece 15. In the preferred embodiment, this valve is a constant speed hydraulic valve manufactured by Waterman Hydraulics Corporation, Skokie, Ill.

A check valve 52 allows fluid from the reservoir 51 to bypass the control valve 50 and return to the cylinder 41 after the workpiece has been machined and the tool is returned to its original starting position. It is, of course, contemplated that automatic means be employed to accomplish this function.

An alternative embodiment of the invention is shown in FIG. 2. In this embodiment, the lower plate 40 supports a constant speed hydraulic or electric motor 55 which drives a gear 56 mounted to move with the plate 40. A threaded shaft 58 extends from the body 10, and its rate of movement relative to the plate 40 is governed by the speed of the motor 55. The gear 56 includes internal threads 59 which cooperate with the threads on the shaft 58, and therefore control the rate of movement between the plate 40 and the shaft 58, and thus the rate of movement between the tool and the workpiece, is controlled by the motor 55. In this case, the prime motive force again is supplied by electrolyte pressure within the chamber 12 and the motor 55 merely controls or limits the rate of movement. With this embodiment, the backlash is always in the same direction.

In the hydraulic embodiment shown in FIG. 1, hydraulic means may be employed to return the tool to its original starting position after the work-piece has been completely machined so that the workpiece may then be removed and a new unmachined workpiece substituted. With the embodiment of FIG. 2, the motor 55 can be run in the reverse direction to perform this operation.

By controlling the feed rate of the tool relative to the workpiece by means located externally of the electrolyte chamber, while allowing the electrolyte pressure to develop hydrostatic forces tending to move the tool into the workpiece, variations in electrolyte pressure, either long or short term, will not be reflected in the surface finish on the workpiece. Also, since the prime motive force is created by electrolyte pressure within the chamber 12, deflection and separating forces are reduced, allowing equipment size and cost to be correspondingly reduced.

It is understood that while in the apparatus shown in FIG. 1 the tool moves relative to the workpiece, the same principles would apply where the tool is held stationary and the workpiece moved by hydrostatic forces.

While the forms of apparatus herein described constitute preferred embodiments of the invention, it is to be understood that the invention is not limited to these precise forms of apparatus, and that changes may be made therein without departing from the scope of the invention.

What is claimed is:

1. Electrochemical machining apparatus including a body having means forming an electrolyte chamber therein, means for mounting a workpiece within said chamber, an electrochemical machining tool positioned within said chamber, and means for introducing electrolyte under pressure into said chamber so that it flows at a high velocity between said tool and said workpiece, the improvement comprising force receiving means slidably mounted within said electrolyte chamber including said electrochemical machining tool, said force receiving means responsive to the pressure of said electrolyte within said chamber for moving said tool relative to said workpiece as workpiece material is anodically removed; and separate regulating means external of said cavity, said regulating means being mechanically connected to said force receiving means and to said body for regulating the rate at which said tool moves relative to said workpiece.

2. The apparatus of claim 1 including means defining an electrolyte entry port opening into one end of said chamber and wherein said force receiving means includes means defining an electrolyte exit port at the other end of said chamber, said workpiece and said tool being mounted within said chamber between said ports, said tool being slidably received within said chamber and having an area on the side facing the electrolyte entry port larger than the area on the side facing the electrolyte exit port so that the tool is moved away from said electrolyte entry port and into and through said workpiece as a result of the pressure of said electrolyte within said cavity.

3. The apparatus as defined in claim 1 wherein said regulating means includes a hydraulic cylinder;

a piston slidably mounted within said cylinder; and an adjustable flow regulating valve connected to regulate the flow of hydraulic fluid from said cylinder as said piston is moved relative thereto in response to the movement of the force receiving means as a result of electrolyte pressure within said chamber.

4. The apparatus of claim 1 wherein said regulating means includes a motor;

means supplying power to said motor;

means for converting the rotational movement of said motor into linear movement;

said motor controlling the rate at which said tool moves relative to said workpiece in response to the motive force supplied by said electrolyte under pressure within said chamber.

5. The apparatus of claim 4 wherein said motor is hydraulically driven.

6. The apparatus of claim 4 wherein said motor is electrically driven.

7. The apparatus of claim 1 further including a body and wherein said electrolyte chamber is formed within said body, wherein said electrochemical machining tool is slidably mounted within said electrolyte chamber and has connected thereto a force receiving member, and wherein said regulating means includes a hydraulic cylinder and a piston slidably mounted within said cylinder;

a plurality of guide posts having one end thereof attached to said force receiving member extending through said body and the other end thereof attached to said hydraulic cylinder;

means attaching said piston within said cylinder to said body; and an adjustable flow regulating valve connected to regulate the flow of fluid from said cylinder as the piston is moved relative thereto in response to movement of said tool through said workpiece caused by said electrolyte pressure.

8. The apparatus of claim 7 wherein said guide posts are supported within said body in accurate alignment by antifriction devices.

References Cited

UNITED STATES PATENTS 3,499,830    3/1970    Haggerty et al.     204—224

FOREIGN PATENTS

| | | | |
|---|---|---|---|
| 974,338 | 11/1964 | Great Britain | 204—224 |
| 1,062,593 | 3/1967 | Great Britain | 204—143 |
| 38/12,829 | 7/1963 | Japan | 204—224 |
| 39/22,113 | 10/1964 | Japan | 204—143 |
| 1,065,485 | 4/1967 | Great Britain | 204—143 M |

JOHN H. MACK, Primary Examiner

D. R. VALENTINE, Assistant Examiner

U.S. Cl. X.R.

204—225, 275